(12) United States Patent
Talvitie et al.

(10) Patent No.: US 11,520,644 B2
(45) Date of Patent: Dec. 6, 2022

(54) SOFTWARE-TRACE MESSAGE SINK PERIPHERAL

(71) Applicant: Nordic Semiconductor ASA, Trondheim (NO)

(72) Inventors: Hannu Talvitie, Oulu (NO); Joni Jäntti, Oulu (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/972,969

(22) PCT Filed: May 30, 2019

(86) PCT No.: PCT/EP2019/064132
§ 371 (c)(1),
(2) Date: Dec. 7, 2020

(87) PCT Pub. No.: WO2019/238431
PCT Pub. Date: Dec. 19, 2019

(65) Prior Publication Data
US 2021/0318919 A1    Oct. 14, 2021

(30) Foreign Application Priority Data
Jun. 11, 2018    (GB) .................................... 1809542

(51) Int. Cl.
*G06F 9/54*    (2006.01)
*G06F 1/3296*    (2019.01)
*G06F 13/36*    (2006.01)

(52) U.S. Cl.
CPC ............ *G06F 9/546* (2013.01); *G06F 1/3296* (2013.01); *G06F 13/36* (2013.01)

(58) Field of Classification Search
None
See application file for complete search history.

(56) References Cited

U.S. PATENT DOCUMENTS

| 6,253,333 B1 | 6/2001 | Bogumil et al. |
| 2006/0259821 A1 | 11/2006 | Swoboda |

(Continued)

FOREIGN PATENT DOCUMENTS

GB    2481380 A1    12/2011

OTHER PUBLICATIONS

IPO Search Report under Section 17(5) for GB 1809542.2, dated Dec. 14, 2018, 3 pages.

(Continued)

*Primary Examiner* — Charles E Anya
(74) *Attorney, Agent, or Firm* — Klarquist Sparkman, LLP

(57) ABSTRACT

An integrated circuit device has a processor, a software-trace message handling system, a software-trace message sink peripheral, and a hardware interconnect system. The interconnect system is capable of directing software-trace messages from the processor to the software-trace message handling system, and of directing software-trace messages from the processor to the software-trace message sink peripheral. The software-trace message sink peripheral can present an interconnect delay to the processor, when receiving a software-trace message from the processor, that is equal to or substantially equal to an interconnect delay that the software-trace message handling system would have presented to the processor if the software-trace message handling system were to have received the software-trace message.

19 Claims, 7 Drawing Sheets

(56) References Cited

U.S. PATENT DOCUMENTS

| | | | |
|---|---|---|---|
| 2007/0226795 A1* | 9/2007 | Conti | G06F 21/554 |
| | | | 726/22 |
| 2008/0115137 A1* | 5/2008 | Gower | G06F 13/4239 |
| | | | 718/102 |
| 2014/0052930 A1 | 2/2014 | Gulati et al. | |
| 2014/0337660 A1* | 11/2014 | Hutchings | G06M 3/00 |
| | | | 713/600 |
| 2014/0359374 A1 | 12/2014 | Shirlen et al. | |
| 2015/0046617 A1* | 2/2015 | Shirlen | G06F 11/364 |
| | | | 710/117 |
| 2015/0143343 A1* | 5/2015 | Weiss | G01R 31/31705 |
| | | | 717/128 |

OTHER PUBLICATIONS

International Search Report and Written Opinion for PCT/EP2019/064132, dated Oct. 10, 2019, 13 pages.

* cited by examiner

SOFTWARE-TRACE MESSAGE SINK PERIPHERAL

CROSS REFERENCE TO RELATED APPLICATIONS

This is the U.S. National Stage of International Application No. PCT/EP2019/064132, filed May 30, 2019, which was published in English under PCT Article 21(2), which in turn claims the benefit of Great Britain Application No. 1809542.2, filed Jun. 11, 2018.

BACKGROUND OF THE INVENTION

The present invention relates to apparatus and methods involving software-trace messages, including, but not limited to, methods for developing software for use in System on Chip (SoC) devices such as radio-on-chip devices.

In the field of embedded-software development, it is known to log and record debug information during execution of the software being developed. This information is used by software developers to isolate, identify and correct mistakes or "bugs" in the software code that might otherwise be difficult to find. Such information is sometimes referred to as "trace" information. Trace messages may be output from an embedded device, e.g. through a debug port, to a software developing environment where the trace information is presented to the human user.

Thus, tracing involves recording events (e.g. system calls) during run-time of the software for "off-line" human analysis. The detection and storage of events during run-time usually requires the insertion of lines of tracing code in the computer program. The inserted code may comprise instructions to send trace messages with debug information (e.g. a timestamp) to a hardware software-trace message handling system which stores the traces (e.g. in a circular RAM buffer) and allows user access to the debug information.

Embedded systems are often very sensitive to timing, especially when running real-time code. For example, in Time Division Multiple Access (TDMA) schemes as used in some radio-on-chip devices, a communication channel is divided into multiple time slots allocated to different radio receivers and transmitters. In this case, the devices must receive and transmit signals at precise times.

The code inserted to send trace messages to the software-trace message handling system can significantly affect the timing behaviour of the overall system. Once the development of the software is complete and all apparent bugs have been corrected or dealt with, the software trace messaging system is typically no longer used. If all code within the software pertaining to the detection of events and to the generation of debug-sensitive information is simply removed or omitted, this is likely to cause the timing behaviour of the software product to change. For example, as the software is no longer spending processor time sending trace messages to the software-trace message handling system, the software may speed up considerably. This may cause problems in devices sensitive to timing such as TDMA radio receivers.

This change in software timing is often undesirable. The software may have been developed, with considerable programming effort, in order to behave in a particular way. Removal of the software trace instructions from the computer program can mean that this behaviour changes, undermining the efforts to fine tune the program behaviour. It might require considerable programming effort to restore the desired program behaviour after removal of the software trace instructions from the program with a risk of introducing new bugs. Indeed, such restoration can be a significant part of the work required to take the product from the development phase to the final production phase for eventual commercialisation.

If, on the other hand, the trace instructions are not removed from the software after development is complete, the software-trace message handling system will also have to be retained in the final product. Such handling systems generally consume significant power which is not desirable, especially in battery-powered devices.

The present invention seeks to provide an alternative approach that reduces or overcomes these problems.

SUMMARY OF THE INVENTION

The present invention provides an integrated circuit device having a system for handling software-trace messages, the integrated circuit device comprising:
  a processor;
  a software-trace message handling system;
  a software-trace message sink peripheral; and
  a hardware interconnect system,
  wherein:
  the hardware interconnect system connects the processor with the software-trace message handling system and with the software-trace message sink peripheral;
  the hardware interconnect system is capable of directing software-trace messages from the processor to the software-trace message handling system;
  the hardware interconnect system is capable of directing software-trace messages from the processor to the software-trace message sink peripheral;
  and
  the software-trace message sink peripheral is configured or is configurable to present an interconnect delay to the processor, when receiving a software-trace message from the processor, that is equal to or substantially equal to an interconnect delay that the software-trace message handling system would have presented to the processor if the software-trace message handling system were to have received the software-trace message.

The invention extends to a method of handling software-trace messages in an integrated circuit device, the method comprising:
  providing an integrated circuit device comprising a processor, a software-trace message handling system, a software-trace message sink peripheral, and a hardware interconnect system, wherein the hardware interconnect system connects the processor with the software-trace message handling system and with the software-trace message sink peripheral, wherein the hardware interconnect system is capable of directing software-trace messages from the processor to the software-trace message handling system, wherein the hardware interconnect system is capable of directing software-trace messages from the processor to the software-trace message sink peripheral, and wherein the software-trace message sink peripheral is configured or is configurable to present an interconnect delay to the processor, when receiving a software-trace message from the processor, that is equal to or substantially equal to an interconnect delay that the software-trace message handling system would have presented to the processor if the software-trace message handling system were to have received the software-trace message;

the hardware interconnect system, in a first state, directing software-trace messages from the processor to the software-trace message handling system; and the hardware interconnect system, in a second state, directing software-trace messages from the processor to a software-trace message sink peripheral.

The invention further extends to a method of developing software for an integrated circuit device, the method comprising:

providing an integrated circuit device comprising a processor, a software-trace message handling system, a software-trace message sink peripheral, a hardware interconnect system, wherein the hardware interconnect system connects the processor with the software-trace message handling system and with the software-trace message sink peripheral, wherein the hardware interconnect system is capable of directing software-trace messages from the processor to the software-trace message handling system, wherein the hardware interconnect system is capable of directing software-trace messages from the processor to the software-trace message sink peripheral, and wherein the software-trace message sink peripheral is configured or is configurable to present an interconnect delay to the processor, when receiving a software-trace message from the processor, that is equal to or substantially equal to an interconnect delay that the software-trace message handling system would have presented to the processor if the software-trace message handling system were to have received the software-trace message;

developing software for the integrated circuit device;

executing the software on the processor of the integrated circuit device, the software causing the processor to generate software-trace messages and the software causing the software-trace messages to be directed from the processor to the software-trace message handling system;

using the software-trace messages to debug the software; and configuring the integrated circuit so that further software-trace messages, generated by the processor when executing the software, will be directed to the software-trace message sink peripheral, or modifying the software so that further software-trace messages, generated by the processor when executing the modified software, will be directed to the software-trace message sink peripheral, the modified software constituting a release version of the software.

Thus, it will be seen that embodiments of the present invention support software development in which tracing code within the software is not removed after development is complete. In the finished product, a software-trace message sink peripheral can receive trace messages, instead of sending the trace messages to the software-trace message handling system. The software-trace message sink peripheral preferably uses less power when receiving a trace message than the software-trace message handling system would use to receive and process the same trace message (or a corresponding trace message). In some embodiments, the software-trace message sink peripheral may be in a different power domain from that of the software-trace message handling system; this can allow the software-trace message handling system and/or a clock that regulates the software-trace message handling system, and/or a phase locked loop that regulates a clock signal of the clock, to be powered down in the released device, thus saving even more power.

In order to preserve substantially the same system timings that were present during development, the software-trace message sink peripheral presents a delay to the processor which imitates that of the software-trace message handling system. The delay may be fixed (e.g. hard-wired) or may be configurable. Where the delay is configurable, it may be tuned so as to render the timing behaviour of the software during development substantially identical to the timing behaviour of the released software.

In some embodiments, the software-trace message sink peripheral may comprise a configurable delay unit for configuring the interconnect delay presented to the processor by the software-trace message sink peripheral.

The software-trace message sink peripheral may be configured to output an acknowledgement to the hardware interconnect system in response to receiving a software-trace message, wherein the interconnect delay presented to the processor by the software-trace message peripheral depends on a delay between when the software-trace message sink peripheral receives the software-trace message and when the software-trace message sink peripheral outputs the acknowledgement. The delay unit may control this acknowledgement delay in order to control the overall interconnect delay presented to the processor.

In some embodiments, the interconnect delay presented by the software-trace message sink peripheral can be controlled by software executed by the processor.

The length of the interconnect delay presented by the software-trace message sink peripheral to the processor may be determined by means of simulations. The delay may be set according to the requirements of a particular usage or configuration of the device.

In some embodiments, the software-trace message sink peripheral may be configured to read a latency parameter directly from an address in memory (e.g. via Direct Memory Access, DMA) and to control the interconnect delay presented by the software-trace message sink peripheral in accordance with the latency parameter. In some embodiments, the latency parameter may be read from memory upon start-up or reset of the integrated circuit device.

In some embodiments, whether a software-trace message is directed to the software-trace message handling system or to the software-trace message sink peripheral may be determined by the state of an electronic switch, or in dependence on a value stored in a register of the integrated circuit device. In other embodiments, whether a software-trace message is directed to the software-trace message handling system or to the software-trace message sink peripheral may be determined by a property of the software executing on the processor. For example, a debug version of the software may direct software-trace messages to the software-trace message handling system, while a release version of the same software may contain identical instructions to the debug version, except that a destination address for writes to the software-trace message handling system is replaced with an address of the software-trace message sink peripheral. In this way, the timing behaviour of the debug version and release version of the software may be identical. Some embodiments may support more than one of these options.

In some embodiments, the hardware interconnect may comprise a switch (e.g., comprising one or more transistors) for directing software-trace messages from the processor to either the software-trace message handling system or to the software-trace message sink peripheral.

In some embodiments, the hardware switch is controllable by software executed on the processor. The switch may be controllable, through hardware, in dependence on a value in a register of the integrated circuit device. The register could be at a predetermined address in non-volatile memory such as flash memory or one-time programmable memory—e.g., in a flash-memory configuration region. If the register comprises a one-time programmable memory, this can be used to irreversibly disable the software-trace message handling system in release implementations of the device. The value in the register may be the address of the software-trace message handling system or the address of the software-trace message sink peripheral. As a further alternative, the switch may be controllable from an external debug interface of the integrated circuit device—e.g., by sending a suitable signal to the integrated circuit device through the debug interface.

The switch can be used to direct trace messages to the software-trace message handling system during a debug mode and to the software-trace message sink peripheral during a non-debug mode.

In some embodiments, the switch is controllable by a debug mode detection unit that is configured to detect when the system is in a debug mode. For example, the presence of a debugging connector cable attached to the integrated circuit may be used to indicate that the system is to be in a debug mode, and may cause the debug mode detection unit to set the switch to direct the software-trace messages to the software-trace message handling system. Removal of the debugging connector cable may be used to indicate that the system is to return to non-debug mode, and may cause the debug mode detection unit to set the switch to direct the software-trace messages to the software-trace message sink peripheral.

In a set of embodiments, the device comprises memory storing software, wherein the software comprises instructions which when executed on the processor cause the processor to direct software-trace messages from the processor to the software-trace message handling system when the system is in a debug mode, and to direct software-trace messages to the software-trace message sink peripheral when the system is in a non-debug mode.

The software may be adapted to read an address from memory (e.g., from non-volatile memory) and to direct software-trace messages to said address, wherein said address may be an address of the software-trace message handling system or may be an address of the software-trace message sink peripheral. Alternatively, the software may store an address of the software-trace message handling system and an address of the software-trace message sink peripheral, e.g., as static variables within the software, and may comprise instructions for reading a value (e.g., a binary flag) from a memory location in the integrated circuit device, and for determining whether to address software-trace messages to the software-trace message handling system or to the software-trace message sink peripheral in dependence on the value in said memory location.

In some embodiments, the integrated circuit device itself may be reconfigured so that software-trace messages, generated by the processor, are directed to the software-trace message sink peripheral instead of the software-trace message handling system, without necessarily making any changes at all to the software.

Thus, a configuration may be made to the hardware and/or software of the final product, after completion of a development phase, to configure the device so that the hardware interconnect directs software-trace messages to the software-trace message sink peripheral.

In some embodiments, the software may be modified so that software-trace messages are sent to the software-trace message sink peripheral. In particular, after development is complete, the software may be modified by performing a global search and replace operation on the object code to replace instances (preferably all instances) of an address of the software-trace message handling system (e.g., in data write instructions) with an address of the software-trace message sink peripheral. (The integrated circuit device may support memory-mapped I/O for peripherals, including for the software-trace message handling system and the software-trace message sink peripherals.) Alternatively, the software may conveniently contain a global address parameter defining the destination of all the software-trace messages—e.g., stored in a linker file. This parameter may be set to the address of the software-trace message handling system address or the address of the software-trace message sink peripheral, as required, before the software is compiled and/or linked.

The software-trace message sink peripheral may be in a first power domain and the software-trace message handling system may be in a second power domain different from the first power domain. Thus, the software-trace message handling system can be powered down while the software-trace message sink peripheral is powered up.

Further, the software-trace message sink peripheral may be configured to use less power when handling the software-trace message than the software-trace message handling system would use if the software-trace message handling system were to have received the software-trace message.

Thus, trace code may be retained in the software without requiring the power intensive software trace-message handling system to deal with the trace messages during non-debug mode. The software-trace message handling system only deals with the trace messages during debug mode.

In some embodiments, the software-trace message handling system comprises a trace buffer for storing software-trace messages. The buffer may be sized to store hundreds, thousands, or millions of software-trace messages.

The software-trace message sink peripheral may comprise a memory which may be no larger than a largest software-trace message that the processor can send to the hardware interconnect system. It may be configured so that each software-trace message received by the software-trace messages sink peripheral at least partly overwrites a preceding or immediately-preceding software-trace message, in the memory. Alternatively, software-trace message sink peripheral may contain no memory at all and may simply discard each bit of each software-trace message immediately after receiving it.

In some embodiments, the software-trace message sink peripheral has no digital logic for performing a logical operation on a received software-trace message (i.e., for processing the content of the message). Similarly, in some embodiments, the software-trace message sink peripheral has no interfaces other than an interface to the hardware interconnect system. The software-trace message sink peripheral may comprise acknowledgement logic for sending an acknowledgement, through the hardware interconnect system, of each software-trace message received by the software-trace message sink peripheral.

The software-trace message handling system, on the other hand, will typically comprise logic gates for processing received software-trace messages. It will consume substantially more power than the software-trace message sink peripheral would when receiving the same software-trace message. The software-trace message handling system may gather software-trace messages from a plurality of sources and coordinate the flow of trace messages during code execution. The source of each trace message may be ascertained and added. A time stamp may be associated with each trace message received by the software-trace message handling system. The trace messages may need reformatting in accordance with a format specified by a software development trace tool. In general, the software-trace message handling system is likely to require a significant amount of logic to process the received trace messages. This logic can have both static power loss (that is, leakage current when the logic is not being used) and dynamic power loss (that is, power consumption when the logic is being clocked and used).

In some embodiments, the software-trace message handling system implements the Arm™ CoreSight™ specification.

In contrast, the software-trace message sink peripheral may only comprise logic for acknowledging receipt of a trace message with an appropriate interconnect delay.

The relatively uncomplicated structure of the software-trace message sink peripheral can result in the software-trace message sink peripheral requiring considerably less power than the software-trace message handling system.

The integrated circuit device may comprise a random-access memory (RAM) and a RAM controller that are separate from the software-trace message sink peripheral. The RAM controller may have a connection to the hardware interconnect system that is distinct from a connection of the software-trace message sink peripheral to the hardware interconnect system.

In a preferred embodiment, the interconnect delay presented by the software-trace message sink peripheral is equal to (not only substantially equal to) the interconnect delay that the software-trace message handling system would have presented to the processor if the software-trace message handling system were to have received the software-trace message (e.g., to within one processor clock cycle or one bus clock cycle). This results in no change at all in the system timings from the development phase to the production phase. However, tolerances where the interconnect delay presented by the software-trace message sink peripheral is within ±1% or ±10% of the interconnect delay that would have been presented by the software-trace message handling system may be used. Such small differences in the value of the two interconnect delays presented to the processor may not result in a significant change in system behaviour and may be tolerated.

The description above of the integrated circuit with a single processor and a single sink peripheral can also be applied to the case where there are a plurality of processors and a plurality of peripherals.

For example, in some embodiments the integrated circuit may comprise two or more processors and two or more software-trace message sink peripherals, each software-trace message sink peripheral being configured or configurable to present a respective interconnect delay to a respective processor of the two or more processors, when receiving a respective software-trace message.

BRIEF DESCRIPTION OF THE DRAWINGS

Certain embodiments of the invention will now be described, by way of example only, with reference to the accompanying drawings in which.

DETAILED DESCRIPTION

Figure 1:
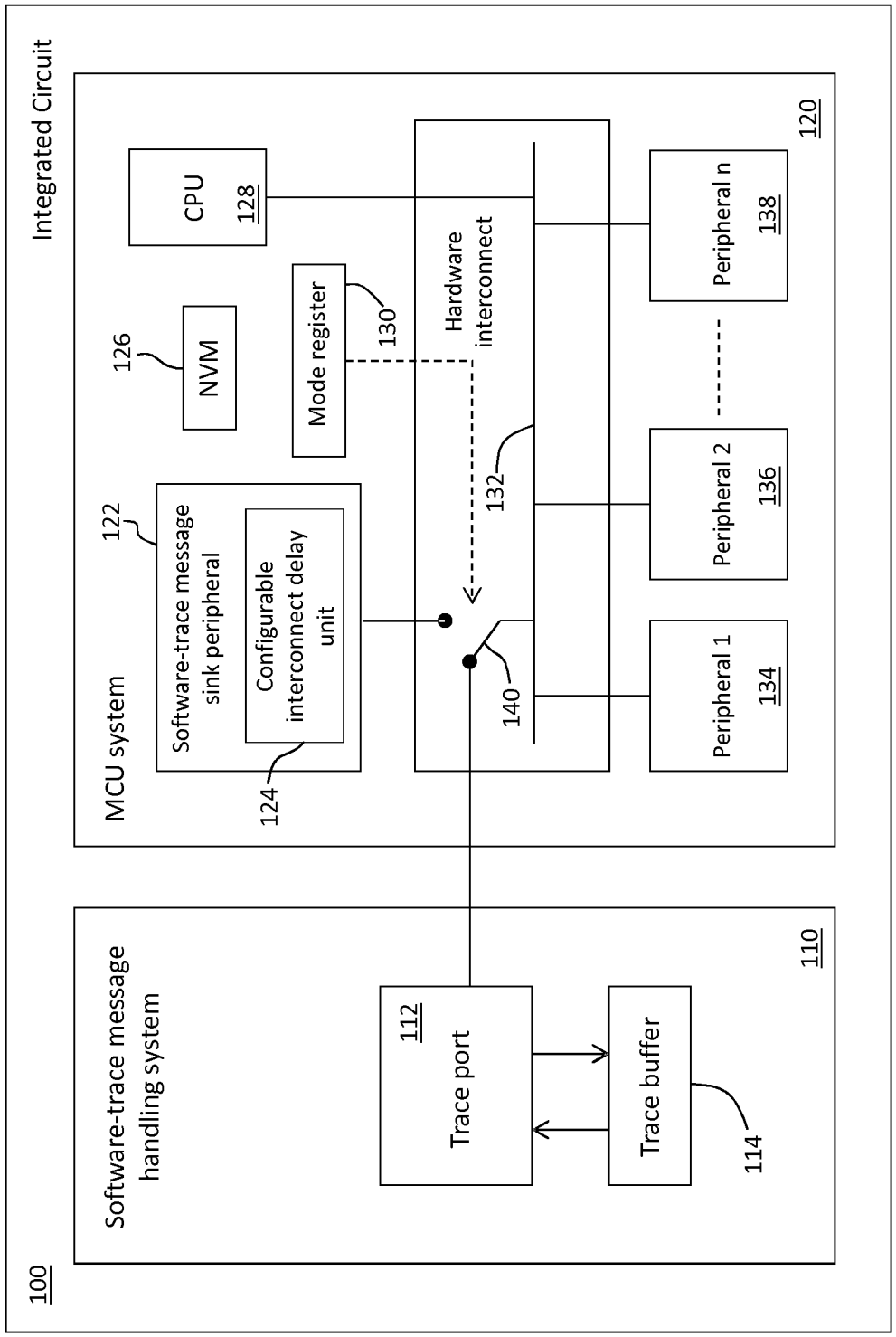
FIG. 1 is a block diagram of an integrated circuit in accordance with an embodiment of the present invention.

FIG. 1 is a block diagram of an integrated circuit system-on-chip (SoC) 100 in accordance with an embodiment of the present invention. The SoC 100 includes a microcontroller unit (MCU) system 120 and a software-trace message handling system 110.

The MCU system 120 is in a different power domain from the software-trace message handling system 110, so that the software-trace message handling system 110 can be powered up or powered down independently of the MCU system 120. A clock (not shown) for the software-trace message handling system 110 can also be disabled when not needed, to save power, as well as any dedicated (phase locked loops) PLLs used by the trace handling system 110.

The MCU system 120 includes a processor (CPU) 128 capable of executing software that may be stored in a non-volatile memory (NVM) 126. In some embodiments, the processor (CPU) 128 could be a microcontroller unit (MCU) in its own right, rather than being a bare processor— i.e. containing its own memory and peripherals, in addition to the components in the wider MCU system 120.

The software may comprise application level software. The software contains instructions for generating trace information when the software is executing on the processor 128 and for issuing software-trace messages which a human user may use while debugging the software.

The processor 128 is connected to the non-volatile memory 126 via a hardware interconnect 132 which may include an ARM™ Advanced High Performance Bus (AHB) and an ARM™ Advanced Peripheral Bus (APB). Various peripherals 134, 136 and 138 are also connected to the processor 128 via the hardware interconnect 132.

The software-trace message handling system 110 has a software-trace port 112 for receiving, over the hardware interconnect 132, software-trace messages generated by the software running on the processor 128. The software-trace message handling system 110 may be an Arm™ CoreSight™ system. It contains memory—e.g., a circular RAM buffer—for storing a log of received software-trace messages, and logic for adding trace source IDs and time stamps, and for formatting the message data appropriately. It has an external interface to allow a human user, equipped with the appropriate debug tools, to access the software-trace messages. The software-trace messages may be output to the external interface (e.g., one or more SoC pins) immediately upon receipt of the messages, or they may be stored in a memory for reading out later (e.g., over a bus interface such as a USB interface).

The MCU system 120 further includes a software-trace message sink peripheral 122 that is also able to receive, over the hardware interconnect 132, software-trace messages generated by the software running on the processor 128. Unlike the software-trace message handling system 110, the software-trace message sink peripheral 122 has no hardware logic for performing any operations on the received software-trace messages—it simply contains a simple state machine for acknowledging each received software-trace message after a configurable delay. Received software-trace messages are discarded. The sink peripheral 122 may have a register equal in length to the maximum length of a software-trace message on the system 120, into which the most-recently-received software-trace message is temporarily written (before being overwritten by the next software-trace message), or it may have no memory at all. It does not have any interfaces other than an interface to the hardware interconnect system 132. The delay can be configured by an interconnect delay unit 124 in the sink peripheral 122. In other embodiments, there may be no interconnect delay unit 124 and the delay is hard-wired into the sink peripheral 122—e.g., using a fixed timer.

These characteristics of the software-trace message sink peripheral 122 result in the software-trace message sink peripheral 122 requiring considerably less power than the software-trace message handling system 110.

The hardware interconnect 132 includes an electronic switch 140, which may be implemented by a multiplexer. When the switch 140 is in a non-debug mode, software-trace messages from the processor 128 are directed to the software-trace message sink peripheral 122. When the switch 140 is in a debug mode, software-trace messages from the processor 128 are directed to the software-trace port 112 of the software-trace message handling system 110.

The switch 140 may be switched between a non-debug mode and a debug mode by means of a debug mode detection unit (not shown) that detects when the system is to enter debug mode or when it is to enter a non-debug mode. The switch 140 may additionally or alternatively be controlled by software executing on the processor 128 which may for example, set a value in a mode register 130 to cause the switch 140 to change states. The switch 140 could additionally or alternatively be controlled through an external debug interface (not shown). In general, the switch 140 may use any mechanism to direct software-trace messages to one of the software-trace message sink peripheral 122 or to the software-trace message handling system 110.

In another embodiment, described below in more detail with reference to FIG. 7, instead of a hardware switch 140, the software executing on the processor 128 may direct messages to the software-trace message handling system 110 or to the software-trace message sink peripheral 122 by addressing the messages to one or the other. The software may include both address values and may determine which to use based on a value in a configuration register of the system 120. Alternatively, the software may read the address from a predetermined address in non-volatile memory 126. The address value could be written to the non-volatile memory 126 via an external interface during production of a device incorporating the SoC 100—e.g., being set to an address of the software-trace message handling system 110 in specimens that are used for debugging the software, and being set to an address of the software-trace message sink peripheral 122 on devices that are released to the public.

As a key concern is to make sure that the software timing behaviour does not change significantly when the software product is finalised after debugging is complete, it is important that the timing of the software-trace messages sent to the software-trace message sink peripheral 122 is the same, or substantially the same, as the timing of the trace messages if they are directed to the software-trace message handling system 110 instead.

In use, the software-trace message handling system 110 presents an interconnect delay to the processor 128 when receiving a software-trace message from the processor 128. Similarly, if the processor 128 were to direct software-trace messages to the software-trace message sink peripheral 122, the software-trace message sink peripheral 122 would also present an interconnect delay to the processor 128.

Therefore, in this embodiment, the interconnect delay presented by the software-trace message sink peripheral 122 to the processor 128 is equal or substantially equal to the interconnect delay presented by the software-trace message handling system 110 to the processor 128. In this way, the software timing is not impacted when switching from using the software-trace message handling system 110 to using the software-trace message sink peripheral 122. This is achieved by a configurable interconnect delay unit 124, located in the software-trace message sink peripheral 122, that is tuneable in order to match the interconnect delay presented by the software-trace message sink peripheral 122 with that of the interconnect delay presented by the software-trace message handling system 110.

The delay unit 124 may set the interconnect delay of the software-trace message sink peripheral 122 to be equal to that of the software-trace message handling system 110 in accordance with a value determined through a calibration process. The appropriate value may be ascertained during product development by simulation of the SoC. In a set of overlapping embodiments, a human user may configure the delay unit 124 to match the interconnect delay presented by the software-trace message sink peripheral 122 to that presented by the software-trace message handling system 110.

In some embodiments, the interconnect delay is at least in part defined by the sending of an acknowledgement (ACK) signal from the software-trace message sink peripheral 122 to indicate that the trace message has been received. By delaying transmission of the ACK signal, the software-trace message sink peripheral 122 can control the interconnect delay of the software-trace message sink peripheral 122 as presented to the processor 128.

In some embodiments, the software-trace message handling system 110 always takes a fixed number of clock cycles to send an acknowledgement from receiving a trace message. The software-trace message sink peripheral 122 may be configured to take the same number of clock cycles to send such an acknowledgement.

In some embodiments, the interconnect delay is set by software executing on the processor 128. The interconnect delay may also be set in a modifiable latency parameter stored in the non-volatile memory 126, which could be in a configuration region that is written to during production.

If the device 100 supports software-trace messages of different types (e.g. different lengths) which the software-trace message handling system 110 takes different lengths of time to receive and acknowledge, the software-trace message sink peripheral 122 may be configurable to present corresponding different delays to the processor 128. However, in a typical Arm™ CoreSight™ implementation, the messages are always of fixed length, so this is not required.

As explained, in prior art products, code relating to tracing is typically deleted or omitted from the final version of the product before product release. Excluding the trace code may be done by setting a flag that indicates whether the tracing code should be used. If the code were retained, the software-trace messages would need a destination. This would require retention of an active and enabled software-trace message handling system in the final product. As software-trace message handling systems generally require relatively high levels of power to function, this results in power inefficiency in the final product.

The low power software-trace message sink peripheral 122 solves this problem. Software-trace messages can be directed to the high power software-trace message handling system 110 during a debug mode but can be directed to the low-power software-trace message sink peripheral 122 during a non-debug mode. This means that during a non-debug mode the software-trace message handling system 110 can be powered down thus saving power whilst the software-trace message sink peripheral 122 accepts software-trace messages from the processor 128, instead.

The present scheme has the advantage that code relating to the generation of software-trace messages may be retained in the software because the SoC 100 still provides a destination for the software-trace messages while also reducing power consumption. This means that in the final product, the timing behaviour of the software does not significantly change. In addition, high power use is avoided by using the low power software-trace message sink peripheral 122 to receive software-trace messages, instead of the software-trace message handling system 110, when the system is not in debug mode.

Figure 2:
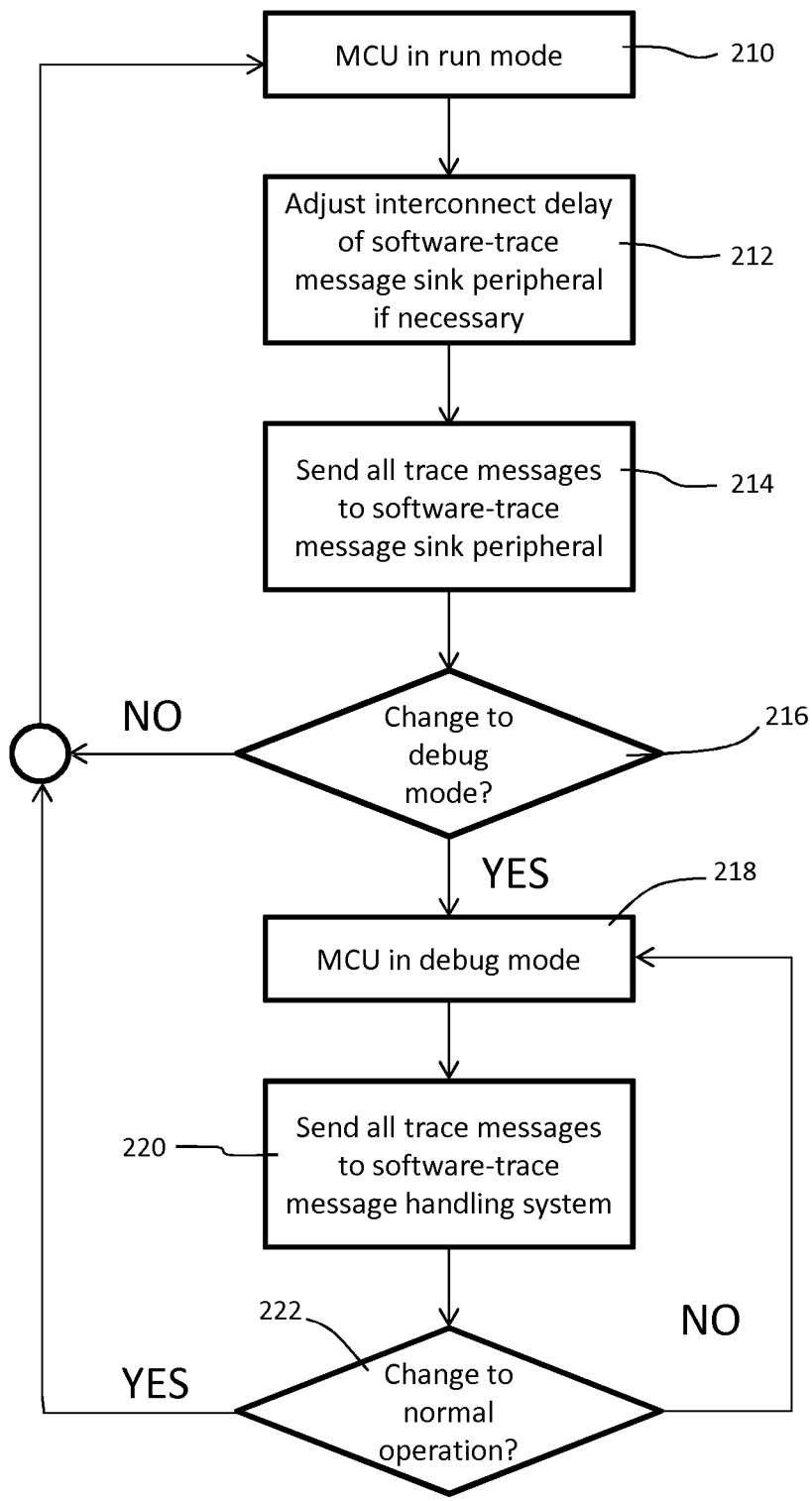
FIG. 2 is a flowchart of a sequence of steps carried out by the integrated circuit of FIG. 1 for handling software-trace messages.

FIG. 2 is a flowchart showing steps involved in the routing of software-trace messages, according to an embodiment of the present invention. At step 210, the MCU 120 is operating in a non-debug mode. At step 212, the latency of the software-trace message sink peripheral 122 is adjusted if necessary. The latency is adjusted so that the interconnect delay that the software-trace message sink peripheral 122 presents to the processor 128 is substantially equal to that which the software-trace message handling system 110 would have presented to the processor 128, if the software-trace messages were sent to the software-trace message handling system 110. At step 214, all software-trace messages are directed to the software-trace message sink peripheral 122.

At step 216, a determination is made as to whether to switch the system to operate in debug mode. This may be achieved by input from a human user or by a debug mode detection unit. If the system is not to switch to debug mode, operation continues at 210 where the system remains in non-debug mode.

If the system is to switch to debug mode, operation of the MCU 120 shifts to a debug mode at step 218. At step 220, all software-trace messages are routed to the software-trace message handling system 110. In particular, the software-trace messages may be made accessible via a software-trace port 112 in the software-trace message handling system 110, to which an external development environment may be connected. A user can then make use of the software-trace messages to debug the software.

Figure 3:
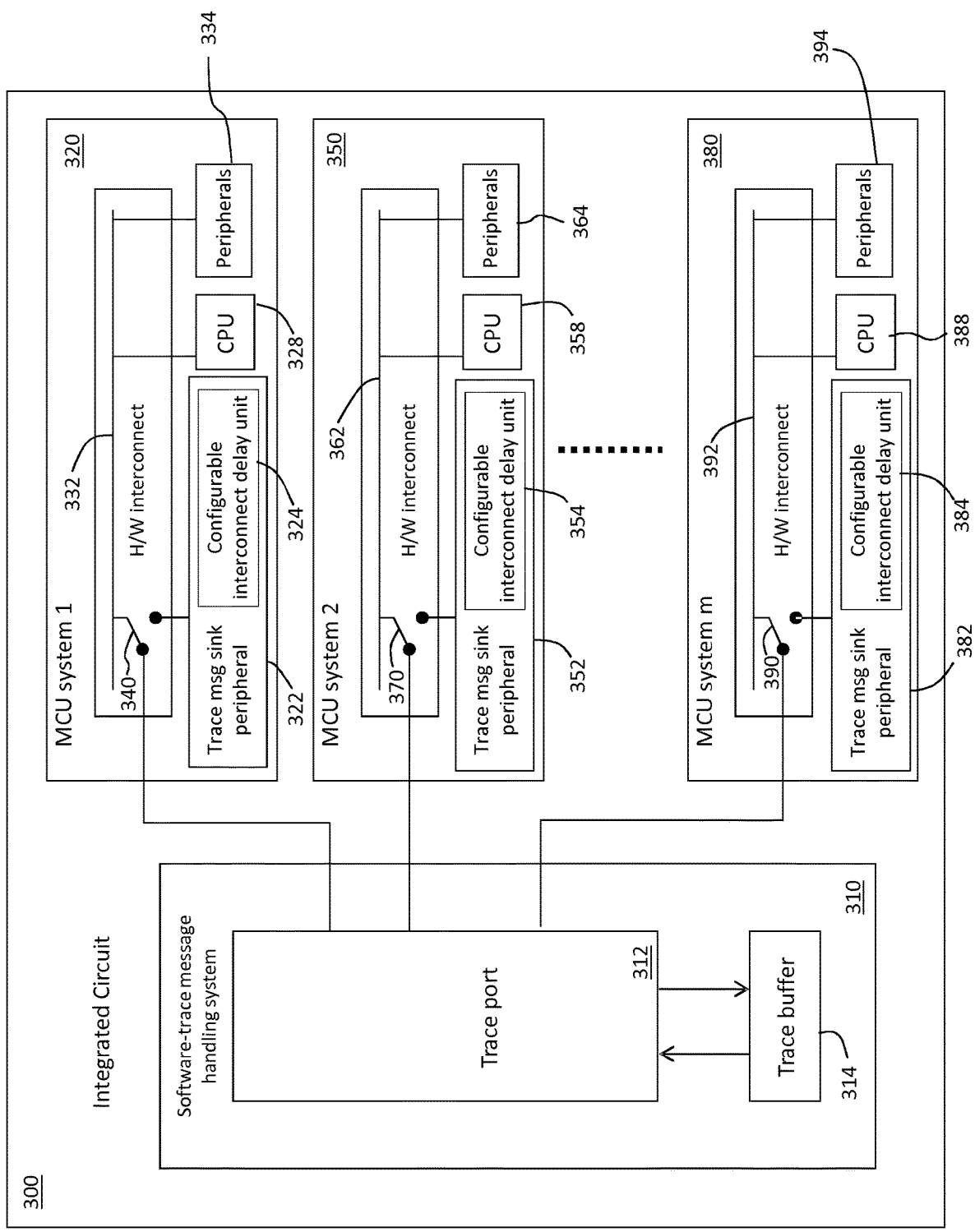
FIG. 3 is a block diagram of an integrated circuit in accordance with another embodiment of the present invention.

FIG. 3 is a block diagram of an SoC 300 in accordance with another embodiment of the present invention. The SoC 300 includes a plurality of microcontroller units (MCUs) system 320, 350 and 380 and a software-trace message handling system 310. The MCUs 320, 350 and 380 are in different power domains from the software-trace message handling system 310, so that the software-trace message handling system 310 can be powered up or powered down independently of the MCU systems 320, 350 and 380.

Each MCU system 320, 350 and 380 includes a respective processor (CPU) 328, 358, 388 capable of executing software that may be stored in non-volatile memory (not shown). The software may comprise application level software. The software may further comprise instructions for generating software-trace messages for use when debugging the software.

Each processor 328, 358, 388 is connected to the non-volatile memory via hardware interconnect modules 332, 362, 392. Various peripherals 334, 364, 394 are also connected to the processors via the hardware interconnect modules 332, 362, 392.

Each MCU system 320, 350, 380 further includes a software-trace message sink peripheral 322, 352, 382 that is configured to receive software-trace messages generated by the software running on its respective processor, 328, 358, 388. The software-trace message handling system 310 has a software-trace port 312 that is also configured to receive software-trace messages generated by the software running on the processors 328, 358, 388.

Each hardware interconnect 332, 362, 392 includes a respective switch 340, 370 and 390. When a switch is in a non-debug mode, software trace messages from the respective processor 328, 358, 388 are directed to the respective sink peripheral 322, 352, 382. When a switch is in a debug mode, software trace messages from the respective processor are directed to the trace port 312 of the software-trace message handling system 310.

As above, the switches 340, 370, 390 may be controllable by a debug mode detection unit or by software executing on the respective processors 328, 358, 388 or by a value in a mode register, or by a human user via an external debug interface. For example, a debug mode detection unit may detect the presence or absence of a debugging connector cable attached to the SoC 300 to determine whether the system is in a non-debug mode or debug mode, and to set one or more of the switches 340, 370, 390 accordingly. The skilled person will appreciate that the switches can be controlled by any number of mechanisms to determine whether to direct the software-trace messages to the software-trace message sink peripherals 322, 352, 382 or to the software-trace message handling system 310.

Similar to the embodiment of FIG. 1, a key concern is to make sure that the software timing behaviour does not change when the software product is finalised after debugging is complete. It is therefore important that the timing of the software-trace messages when sent to the software-trace message sink peripherals 322, 352, 382 is the same, or substantially the same, as the timing of the software-trace messages had they been directed to the software-trace message handling system 310 instead.

Each software-trace message sink peripheral 322, 352, 382 presents an interconnect delay to its respective processor 328, 358, 388 or software when the software-trace message sink peripheral receives a software-trace message. The software-trace message handling system 310 also presents an interconnect delay to each processor 328, 358, 388 or software when the software-trace message handling system 310 receives a software-trace message. In a preferred embodiment, the interconnect delays presented by the software-trace message sink peripherals 322, 352, 382 are equal or substantially equal to the interconnect delay that would have been presented by the software-trace message handling system 310 if the latter were to have received the same software-trace messages. This is achieved by use of configurable interconnect delay units 324, 354, 384, one preferably located in each software-trace message sink peripheral, that are tuneable in order to match the interconnect delays presented by each respective software-trace message sink peripheral 322, 352, 382 with that of the interconnect delay presented by the software-trace message handling system 310.

The delay units 324, 354, 384 may set the interconnect delay of each software-trace message sink peripheral 322, 352, 382 to be equal to that of the software-trace message handling system 310. In other embodiments, a human user may control each delay unit 324, 354, 384 to match the interconnect delay of each software-trace message sink peripheral 322, 352, 382 to that of the software-trace message handling system 310. In some embodiments, the delay of each software-trace message sink peripheral 322, 352, 382 is determined by the sending of an acknowledgement (ACK) signal from each software-trace message sink peripheral 322, 352, 382 to indicate that a software-trace message has been received. By delaying transmission of the ACK signal, each software-trace message sink peripheral 322, 352, 382 can control its interconnect delay as presented to its respective processor 328, 358, 388 or to the software. In some embodiments, the interconnect delay is set by software executing on the processor 328, 358, 388. The interconnect delay may be set in dependence on a modifiable latency parameter stored in non-volatile memory.

The device of FIG. 3 allows retention of the software-trace message handling system 310 for use during debugging, whilst also providing a low-power "sink" for the software-trace messages sent by one or more of the processors 328, 358, 388 during a non-debug mode. In non-debug mode, the software-trace message handling system 310 can be shut down.

Figure 4:
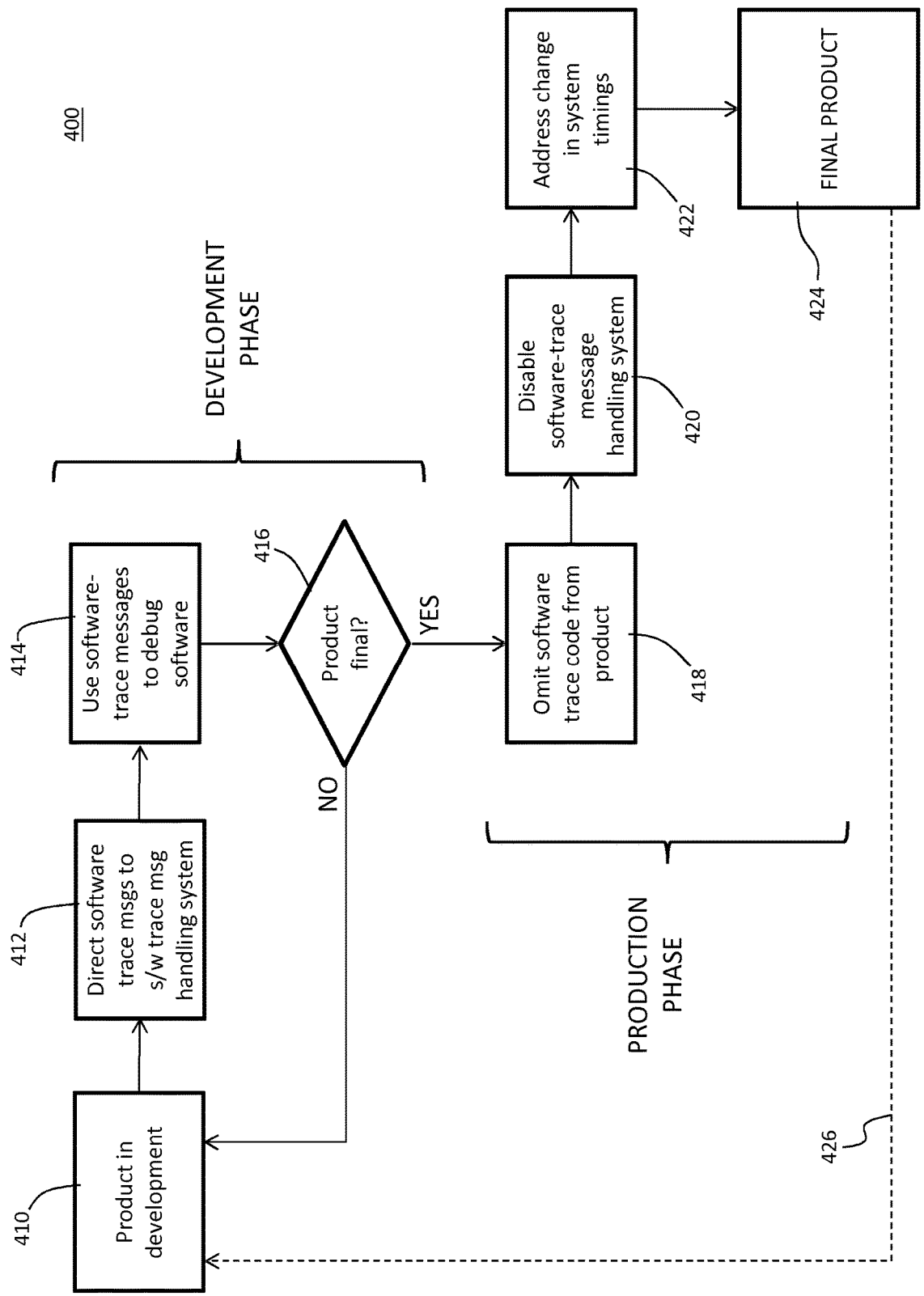
FIG. 4 is a flowchart showing a prior art scheme for developing software for an integrated circuit which removes software-trace messages from the final software product.
Figure 5:
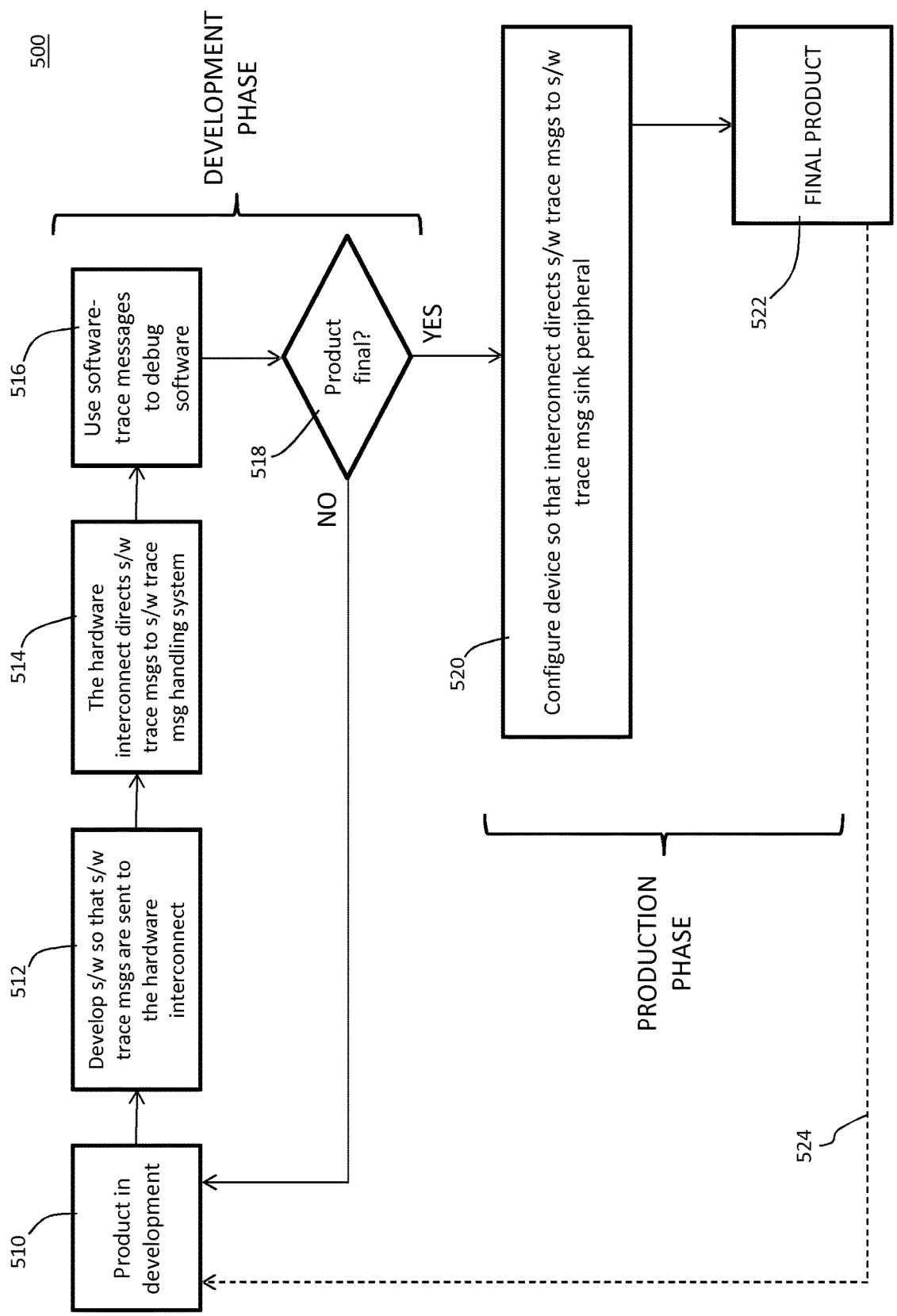
FIG. 5 is a flowchart showing an embodiment of the present invention for developing software for an integrated circuit which retains software-trace messages in the final software product.
Figure 6:
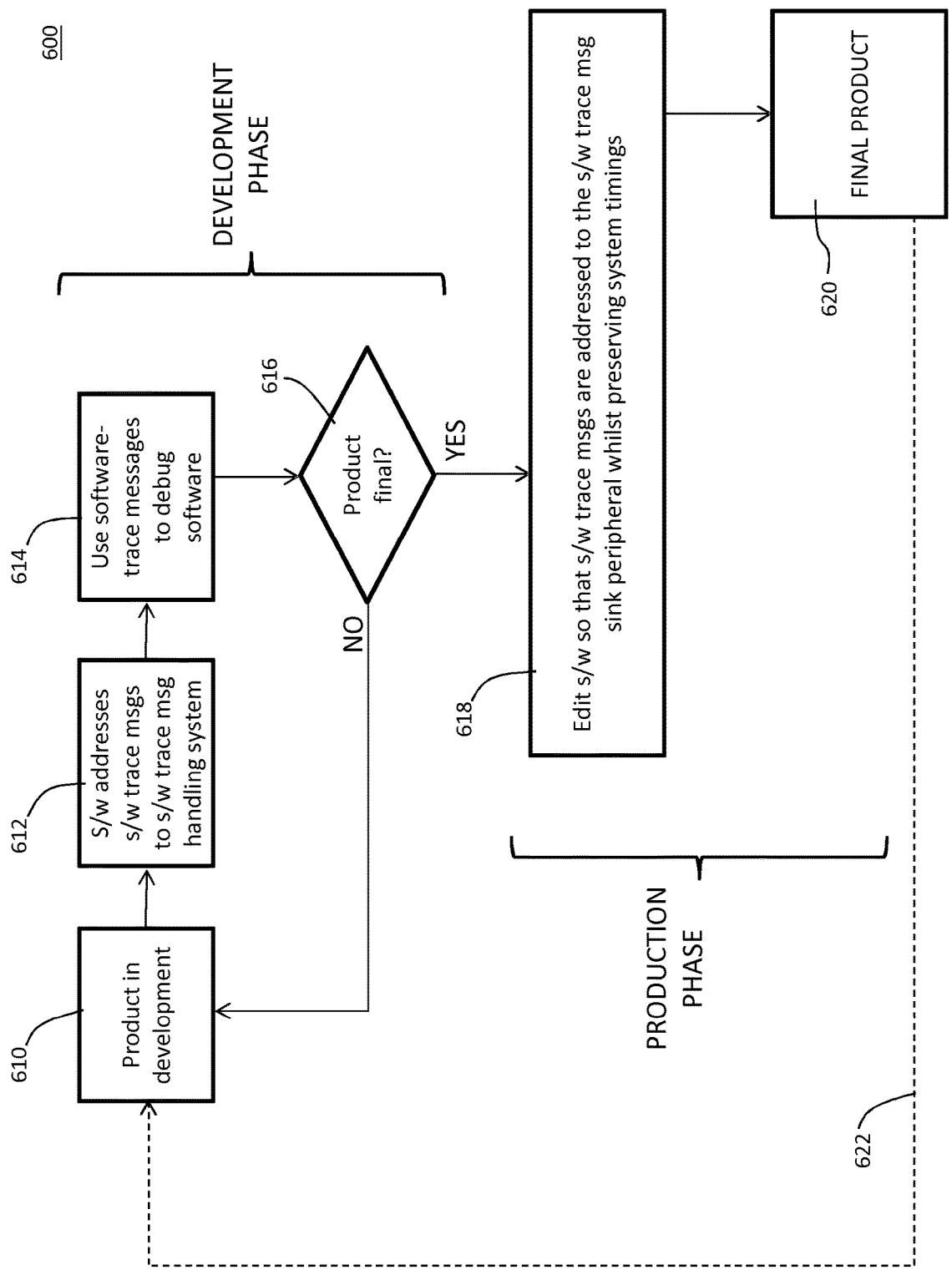
FIG. 6 is a flowchart showing an overlapping embodiment for developing software for an integrated circuit which retains software-trace messages in the final software product.

FIG. 4 is a flowchart illustrating a typical prior art method carried out when developing software for an SoC such as a radio-on-chip device, while FIGS. 5 and 6 show methods embodying the present invention.

In the prior art method 400, at step 410, the software is being developed. The software may include code for generating software-trace information that may be useful for debugging. At step 412, all trace information or trace messages are directed to a software-trace message handling system. At step 414, these trace messages are used to debug the software. At step 416, if the product is not complete, the development cycle continues at step 410. Steps 410-416 comprise at least part of a development phase of the software.

If at step 416 the product is complete, all code for detecting and transmitting software-trace information is deleted or otherwise omitted from the software at step 418. Omitting the tracing code may be done by setting a flag in a build file that indicates whether the tracing code should be included. Further, the software-trace message handling system is itself disabled at step 420 to save power. The product is then finalised at step 424. Steps 418-424 comprise at least part of a production phase of the software.

It is possible that, after a product is finalised and released, a customer may report a bug in the software. In this case, the product design is taken back into development, as shown by the dashed line 426, connecting the final product step 424 to the first step 410 of the development phase.

FIG. 5 shows a scheme 500 embodying the present invention. At step 510, the software is being developed. The software may include code for generating software-trace information that may be useful for debugging. At step 512, the software is developed so that all software-trace messages are sent to the hardware interconnect 132, 332, 362, 392. At step 514, the hardware interconnect 132, 332, 362, 292 directs all software-trace information or software-trace messages to a software-trace message handling system 110, 310. At step 516, these trace messages are used to debug the software. At step 518, if the product is not complete, the development cycle continues at step 510. Steps 510-518 comprise at least part of a development phase of the software.

When the product is complete at step 518, in contrast with the prior art methods, the code for detecting and transmitting software-trace information is retained in the software, and not omitted. Further, the software-trace message handling system 110, 310 is also retained in the hardware design; this allows on-going debugging as new software bugs are identified, even after the product is released. The integrated-circuit design itself also remains unchanged between development and release, which is very important.

During the production phase, at step 520 the device 100, 300 is configured so that the hardware interconnect 132, 332, 362, 392 directs software trace messages to the software-trace message sink peripheral 122, 322, 352, 382. This may be done in a number of ways, as already explained. The software-trace messages may be directed to the software-trace message sink peripheral 122, 322, 352, 382 in response to detecting that the debug cable has been unplugged; a register may be set that controls the switch in the hardware interconnect 132, 332, 362, 392; and/or a target address or a flag may be set in a configuration region of memory, which the software may read to determine where to send the software-trace message.

The interconnect delay unit 124, 324, 354, 384 ensures that the interconnect delay presented by the software-trace message sink peripheral 122, 322, 352, 382 is equal or substantially equal to the interconnect delay presented by the software-trace message handling system 110, 310.

The product is made final at step 522. Steps 520-522 comprise at least part of a production phase.

It is possible that after a product is finalised and released a customer may report a bug in the software. In this case, the product is taken back into development, as shown by the dashed line 524 connecting the final product step 522 to the first step 510 of the development phase.

It will be appreciated that typically only a relatively small number of SoCs 100 will be used during debugging, and it is unlikely that any of these specimens will ever be released into the marketplace. Instead, many thousands, or even millions of other SoCs 100, having the identical circuit design to those used in the development phase, will be manufactured for production. References herein to reconfiguring or changing "the device" should be understood as encompassing not only changing one particular specimen device, but also making a change to the configuration of production versions of devices made using the same integrated-circuit masks (but potentially having different values loaded into a memory or register during manufacture).

FIG. 6 shows a further scheme 600 also embodying the present invention in which the software, rather than the hardware, is changed between development and production. At step 610, the software is being developed. The software includes code for generating software-trace information that is useful for debugging. At step 612 the software addresses software-trace messages to the software-trace message handling system 110, 310 and at step 614 these software-trace messages can be used by a human user to debug the software. At step 616, if the software development is not complete, the development cycle continues at step 610. Steps 610-616 comprise at least part of the development phase of the software.

During a production phase, at step 618, the software is edited so that software-trace messages are addressed to the software-trace message sink peripheral 122, 322, 352, 382 whilst preserving system timings. This may be done, for example, by performing a global "search and replace" on the compiled software object code to replace all instances of the address of the software-trace message handling system 110, 310 with the address of the software-trace message sink peripheral 122, 322, 352, 382. Alternatively, a global variable defining the trace port address may be changed from the address of the software-trace message handling system to the address of the software-trace message sink peripheral before the software is linked by a linker tool. By changing the object code, rather than changing the source code and recompiling, it can be ensured that there is no change to the order of the instructions in the software. However, recompiling is also a possibility. The process ends at step 620. The modified software can then be loaded on all production instances of the SoC 100, 300.

In this way, only the software-trace message sink peripheral 122, 322, 352, 382 is used in the production versions, and the software-trace message handling system 110, 310 can be powered down completely.

The product is made final at step 620. Steps 618-620 comprise at least part of a production phase of the software.

It is possible that after a product is finalised and released a customer may report a bug in the software. In this case, the product is taken back into development, as shown by the dashed line 622 connecting the final product step 620 to the first step 610 of the development phase.

Thus, as explained above with reference to the drawings, the software-trace code and the software-trace message handling system are retained in the final product, whilst a low-power alternative to the software-trace message handling system—the software-trace message sink peripheral—is used to sink software-trace messages when the system is in non-debug mode whilst maintaining system timings.

The software may or may not be modified during the production phase to arrive at the final product, as explained above. However, any modifications to the software during the production phase would only be made to control the destination of the software-trace messages and will be less extensive than removing the software-trace code altogether.

Figure 7:
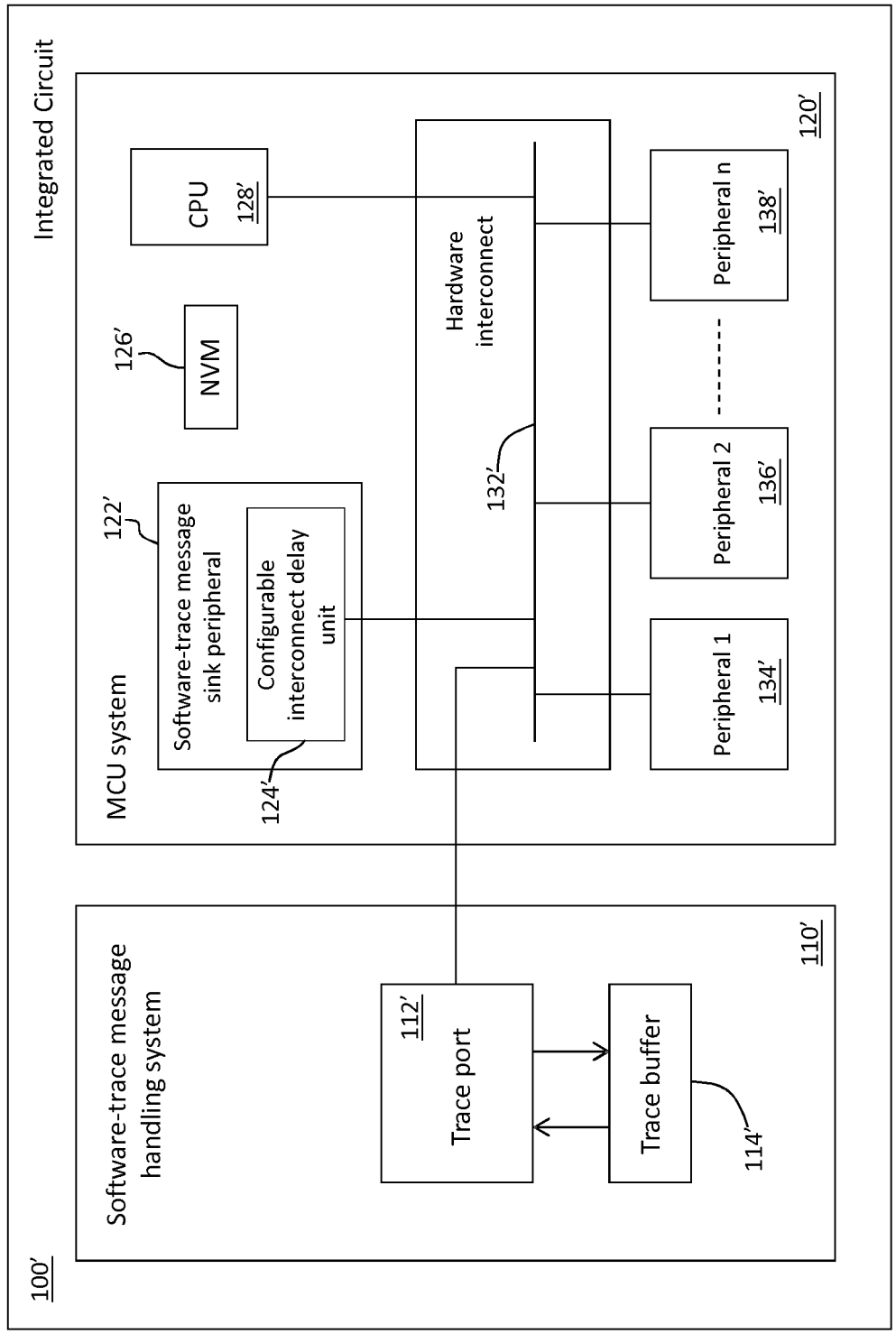
FIG. 7 is a block diagram of an integrated circuit in accordance with a further embodiment of the present invention.

FIG. 7 illustrates a variant system-on-chip 100' that does not have a hardware multiplexer for directing software-trace messages either to the software-trace message handling system or to the software-trace message sink peripheral. Instead, software executing on the processor 128' can determine the destination of the trace messages by addressing data writes to the appropriate unit. This embodiment has been described above.

For example, the software may read an address, stored in non-volatile memory 126', which corresponds to either the address of the software-trace message sink peripheral or to the address of the software-trace messages handling system. The software then directs all trace messages to this address.

Instead of using a multiplexer 140 as in FIG. 1, in the SoC 100' of FIG. 7, the software-trace message sink peripheral 122' and the software-trace message handling system 110' are both permanently reachable via the hardware interconnect 132' (although the software-trace message handling system 110' may be powered down when not in use).

The other components of the SoC 100' of FIG. 7 correspond to the components of SoC 100 of FIG. 1, and are each marked with the same reference numeral but with a suffixed apostrophe.

The invention claimed is:

1. An integrated circuit device having a system for handling software-trace messages, the integrated circuit device comprising:
    a processor;
    a software-trace message handling system;
    a software-trace message sink peripheral; and
    a hardware interconnect system,
    wherein:
    the hardware interconnect system connects the processor with the software-trace message handling system and with the software-trace message sink peripheral;
    the hardware interconnect system is capable of directing software-trace messages from the processor to the software-trace message handling system;
    the hardware interconnect system is capable of directing software-trace messages from the processor to the software-trace message sink peripheral;
    and
    the software-trace message sink peripheral is configured or is configurable to present an interconnect delay to the processor, when receiving a software-trace message from the processor, that is equal to or within one bus clock cycle of an interconnect delay that the software-trace message handling system would have presented to the processor if the software-trace message handling system were to have received the software-trace message;
    and wherein:
    A) the software-trace message sink peripheral is configured to output an acknowledgement to the hardware interconnect system in response to receiving a software-trace message, wherein the interconnect delay presented by the software-trace message sink peripheral depends on a delay between when the software-trace message sink peripheral receives the software-trace message and when the software-trace message sink peripheral outputs the acknowledgement; or
    B) the software-trace message sink peripheral is configured to read a latency parameter directly from a latency parameter address in a memory of the integrated circuit device, and to control the interconnect delay presented by the software-trace message sink peripheral in accordance with the latency parameter.

2. The integrated circuit device of claim 1, wherein the software-trace message sink peripheral is configured to use less power when handling the software-trace message than the software-trace message handling system would use if the software-trace message handling system were to have received the software-trace message.

3. The integrated circuit device of claim 1, wherein the software-trace message sink peripheral is in a first power domain and the software-trace message handling system is in a second power domain, different from the first power domain, such that the software-trace message handling system and/or a clock that regulates the software-trace message handling system, and/or a phase locked loop that regulates a clock signal of the clock, can be powered down while the software-trace message sink peripheral is powered up.

4. The integrated circuit device of claim 1, wherein the software-trace message sink peripheral comprises a configurable delay unit for configuring the interconnect delay presented to the processor by the software-trace message sink peripheral.

5. The integrated circuit device of claim 1, wherein the software-trace message sink peripheral is configured to output an acknowledgement to the hardware interconnect system in response to receiving a software-trace message, wherein the interconnect delay presented by the software-trace message sink peripheral depends on a delay between when the software-trace message sink peripheral receives the software-trace message and when the software-trace message sink peripheral outputs the acknowledgement.

6. The integrated circuit device of claim 1, configured so that the interconnect delay presented by the software-trace message sink peripheral can be controlled by software executed by the processor.

7. The integrated circuit device of claim 1, wherein the software-trace message sink peripheral is configured to read a latency parameter directly from a latency parameter address in a memory of the integrated circuit device, and to control the interconnect delay presented by the software-trace message sink peripheral in accordance with the latency parameter.

8. The integrated circuit device of claim 7, wherein the software-trace messages sink peripheral is configured to read the latency parameter directly from the latency parameter address in the memory upon start-up or reset of the integrated circuit device.

9. The integrated circuit device of claim 1, comprising a switch in the hardware interconnect system for directing software-trace messages from the processor to either the software-trace message handling system or the software-trace message sink peripheral.

10. The integrated circuit device of claim 9, wherein said switch is controllable by software executed on said processor.

11. The integrated circuit device of claim 9, wherein said switch is controllable in dependence on a value in a register of the integrated circuit device.

12. The integrated circuit device of claim 11, wherein the register comprises a one-time programmable memory.

13. The integrated circuit device of claim 9, wherein said switch is controllable from an external debug interface of the integrated circuit device, or is controllable by a debug mode detection unit that is configured to detect when the system is in a debug mode.

14. The integrated circuit device of claim 1, wherein the device comprises memory storing software, wherein the software comprises instructions which when executed on the processor cause the processor to direct software-trace messages from the processor to the software-trace message handling system when the system is in a debug mode, and to direct software-trace messages to the software-trace message sink peripheral when the system is in a non-debug mode.

15. The integrated circuit device of claim 1, wherein the software-trace message handling system comprises a trace buffer for storing software-trace messages.

16. The integrated circuit device of claim 1, wherein the software-trace message sink peripheral has no digital logic for performing a logical operation on the content of a received software-trace message and has no interface other than an interface to the hardware interconnect system.

17. A method of handling software-trace messages in an integrated circuit device, the method comprising:
providing an integrated circuit device having a system for handling software-trace messages, the integrated circuit device comprising:
a processor;
a software-trace message handling system;
a software-trace message sink peripheral; and
a hardware interconnect system,
wherein:
the hardware interconnect system connects the processor with the software-trace message handling system and with the software-trace message sink peripheral;
the hardware interconnect system is capable of directing software-trace messages from the processor to the software-trace message handling system;
the hardware interconnect system is capable of directing software-trace messages from the processor to the software-trace message sink peripheral;
and
the software-trace message sink peripheral is configured or is configurable to present an interconnect delay to the processor, when receiving a software-trace message from the processor, that is equal to or within one bus clock cycle of an interconnect delay that the software-trace message handling system would have presented to the processor if the software-trace message handling system were to have received the software-trace message;
the method further comprising:
the hardware interconnect system, in a first state, directing software-trace messages from the processor to the software-trace message handling system; and
the hardware interconnect system, in a second state, directing software-trace messages from the processor to a software-trace message sink peripheral.

18. The method of claim 17, comprising changing the hardware interconnect system from the first state to the second state by writing a value into a register of the integrated circuit device.

19. A method of developing software for an integrated circuit device, the method comprising:
providing an integrated circuit device having a system for handling software-trace messages, the integrated circuit device comprising:
a processor;
a software-trace message handling system;
a software-trace message sink peripheral; and
a hardware interconnect system,
wherein:
the hardware interconnect system connects the processor with the software-trace message handling system and with the software-trace message sink peripheral;
the hardware interconnect system is capable of directing software-trace messages from the processor to the software-trace message handling system;
the hardware interconnect system is capable of directing software-trace messages from the processor to the software-trace message sink peripheral;
and
the software-trace message sink peripheral is configured or is configurable to present an interconnect delay to the processor, when receiving a software-trace message from the processor, that is equal to or within one bus clock cycle of an interconnect delay that the software-trace message handling system would have presented to the processor if the software-trace message handling system were to have received the software-trace message;

the method further comprising:
- developing software for the integrated circuit device;
- executing the software on the processor of the integrated circuit device, the software causing the processor to generate software-trace messages and the software causing the software-trace messages to be directed from the processor to the software-trace message handling system;
- using the software-trace messages to debug the software; and
- configuring the integrated circuit device so that further software-trace messages, generated by the processor when executing the software, will be directed to the software-trace message sink peripheral, or modifying the software so that further software-trace messages, generated by the processor when executing the modified software, will be directed to the software-trace message sink peripheral, the modified software constituting a release version of the software.

\* \* \* \* \*